(12) United States Patent
Saund et al.

(10) Patent No.: US 8,411,662 B1
(45) Date of Patent: Apr. 2, 2013

(54) BEACON BASED PROXIMITY SERVICES

(75) Inventors: Saran Saund, Mountain View, CA (US); Paul A. Lambert, Mountain View, CA (US)

(73) Assignee: PICO Mobile Networks, Inc., Sunnyvale, CA (US)

( * ) Notice: Subject to any disclaimer, the term of this patent is extended or adjusted under 35 U.S.C. 154(b) by 1286 days.

(21) Appl. No.: 11/542,394

(22) Filed: Oct. 3, 2006

Related U.S. Application Data

(60) Provisional application No. 60/723,299, filed on Oct. 4, 2005.

(51) Int. Cl.
*H04J 3/00* (2006.01)
(52) U.S. Cl. .................................. 370/345; 370/328
(58) Field of Classification Search .............. 370/345, 370/338
See application file for complete search history.

(56) References Cited

U.S. PATENT DOCUMENTS

| | | | |
|---|---|---|---|
| 5,738,583 A | 4/1998 | Comas et al. | |
| 6,272,120 B1 | 8/2001 | Alexander | |
| 6,600,726 B1 | 7/2003 | Nevo et al. | |
| 6,690,935 B1 | 2/2004 | Calot et al. | |
| 6,704,866 B1 | 3/2004 | Benayoun et al. | |
| 6,707,801 B2 | 3/2004 | Hsu | |
| 6,760,587 B2 | 7/2004 | Holtzman et al. | |
| 6,785,892 B1 | 8/2004 | Miller | |
| 6,788,675 B1 | 9/2004 | Yang | |
| 6,793,580 B2 | 9/2004 | Sinclair et al. | |
| 6,795,701 B1 | 9/2004 | Hui et al. | |
| 6,799,056 B2 | 9/2004 | Curley et al. | |
| 6,859,460 B1 | 2/2005 | Chen | |
| 6,879,574 B2 | 4/2005 | Naghian et al. | |
| 6,879,812 B2 * | 4/2005 | Agrawal et al. | 455/67.11 |
| 6,909,705 B1 | 6/2005 | Lee et al. | |
| 6,932,698 B2 | 8/2005 | Sprogis | |
| 7,013,391 B2 * | 3/2006 | Herle et al. | 713/182 |
| 7,072,323 B2 | 7/2006 | Roberts et al. | |
| 7,073,129 B1 | 7/2006 | Robarts et al. | |
| 7,085,257 B1 | 8/2006 | Karves et al. | |
| 7,097,562 B2 | 8/2006 | Gagner | |
| 7,143,171 B2 | 11/2006 | Eriksson et al. | |
| 7,181,544 B2 | 2/2007 | Vangal et al. | |
| 7,224,964 B2 | 5/2007 | Souissi et al. | |
| 7,236,772 B1 | 6/2007 | Botzas | |
| 7,251,235 B2 | 7/2007 | Wentink | |
| 7,324,444 B1 | 1/2008 | Liang et al. | |
| 7,400,722 B2 | 7/2008 | Qi et al. | |
| 7,440,430 B1 | 10/2008 | Jagadeesan et al. | |
| 7,452,278 B2 | 11/2008 | Chen et al. | |
| 2002/0151366 A1 * | 10/2002 | Walker et al. | 463/42 |
| 2002/0152388 A1 * | 10/2002 | Linnartz et al. | 713/176 |
| 2002/0191560 A1 | 12/2002 | Chen et al. | |
| 2002/0199124 A1 | 12/2002 | Adkisson | |
| 2003/0069018 A1 | 4/2003 | Matta et al. | |
| 2003/0182454 A1 | 9/2003 | Huth et al. | |
| 2003/0231625 A1 | 12/2003 | Calvignac | |
| 2004/0066751 A1 | 4/2004 | Tseng et al. | |
| 2004/0105415 A1 * | 6/2004 | Fujiwara et al. | 370/338 |
| 2004/0127277 A1 | 7/2004 | Walker et al. | |
| 2004/0174829 A1 | 9/2004 | Ayyagari | |
| 2004/0185851 A1 | 9/2004 | Nagai | |
| 2004/0196808 A1 | 10/2004 | Chaskar et al. | |
| 2005/0025163 A1 | 2/2005 | Christie | |
| 2005/0032577 A1 | 2/2005 | Blackburn et al. | |
| 2005/0041660 A1 | 2/2005 | Pennec et al. | |
| 2005/0041793 A1 | 2/2005 | Fulton et al. | |
| 2005/0073980 A1 * | 4/2005 | Thomson et al. | 370/338 |
| 2005/0079873 A1 | 4/2005 | Caspi et al. | |
| 2005/0099977 A1 * | 5/2005 | Williams et al. | 370/338 |
| 2005/0157661 A1 | 7/2005 | Cho | |
| 2005/0177639 A1 * | 8/2005 | Reunamaki et al. | 709/227 |
| 2005/0181872 A1 | 8/2005 | Acharya et al. | |
| 2005/0197189 A1 | 9/2005 | Schultz | |
| 2005/0250487 A1 * | 11/2005 | Miwa et al. | 455/422.1 |
| 2005/0250497 A1 | 11/2005 | Ghosh et al. | |
| 2005/0268003 A1 * | 12/2005 | Wang et al. | 710/36 |
| 2005/0286456 A1 * | 12/2005 | McNew et al. | 370/312 |
| 2006/0041750 A1 * | 2/2006 | Carter et al. | 713/168 |
| 2006/0045138 A1 | 3/2006 | Black et al. | |
| 2006/0063539 A1 | 3/2006 | Beyer | |
| 2006/0135262 A1 | 6/2006 | Kennedy et al. | |
| 2006/0172736 A1 | 8/2006 | Nevo | |
| 2006/0205409 A1 | 9/2006 | Chiou et al. | |
| 2006/0221857 A1 | 10/2006 | Bushnell et al. | |
| 2006/0268711 A1 | 11/2006 | Doradla et al. | |
| 2007/0026866 A1 | 2/2007 | Krishnamurthi et al. | |
| 2007/0035513 A1 | 2/2007 | Sherrard et al. | |
| 2007/0047547 A1 | 3/2007 | Conner et al. | |
| 2007/0047697 A1 | 3/2007 | Drewry et al. | |
| 2007/0060355 A1 | 3/2007 | Amaitis et al. | |
| 2007/0076683 A1 | 4/2007 | Chung | |
| 2007/0082671 A1 | 4/2007 | Feng et al. | |
| 2007/0086394 A1 * | 4/2007 | Yamada et al. | 370/338 |
| 2007/0099703 A1 | 5/2007 | Terebilo | |
| 2007/0197237 A1 | 8/2007 | Powell et al. | |
| 2007/0202910 A1 | 8/2007 | Brewer et al. | |
| 2008/0039015 A1 | 2/2008 | Nakata et al. | |

(Continued)

OTHER PUBLICATIONS

IEEE Standards Board, IEEE 802.11 Standard, 1999, 1999 Edition (R2003).*
Newton, Harry. Newton's Telecom Dictionary. 15th Edition. Miller Freeman Inc., 1999. 762. (3 pages).

*Primary Examiner* — Rafael Pérez-Gutiérrez
*Assistant Examiner* — German Viana Di Prisco

(57) ABSTRACT

The invention includes additional uses for the SSID of the IEEE 802.11 beacon to include reliable and secure capability encoding. The SSID in the system can be controlled by applications and transmitted with periodic broadcasting or point to point communication, so interoperable communication of application or user preferences/capabilities/membership can be transmitted and quickly determined by peers.

17 Claims, No Drawings

U.S. PATENT DOCUMENTS

| | | |
|---|---|---|
| 2008/0069105 A1 | 3/2008 | Costa et al. |
| 2008/0095112 A1 | 4/2008 | Wiemann et al. |
| 2008/0123608 A1 | 5/2008 | Edge et al. |
| 2009/0191878 A1 | 7/2009 | Hedqvist et al. |
| 2009/0222358 A1 | 9/2009 | Bednarek |
| 2010/0093374 A1 | 4/2010 | Dacosta et al. |

* cited by examiner

BEACON BASED PROXIMITY SERVICES

The present application claims benefit of Provisional Application No. 60/723,299 filed Oct. 4, 2005, the contents of which are incorporated herein by reference.

FIELD OF THE INVENTION

The present invention relates to wireless networks. More particularly, the present invention relates to the wireless communication protocol IEEE 802.11.

BACKGROUND OF THE INVENTION

It is well known that wireless devices such as telephones, email devices, and PDA's have been enabled for local wireless network communication with Internet protocol backbone networks by way of protocols such as the several forms of IEEE 802.11.

Alternately, automatic connection and communication systems may create a Personal-Area Networks (PAN). Other wireless standards that may be used include IRDA, hiperlan/2, and HomeRF. When a PAN is established, such as between one VoIP mobile phone and another, the members of the PAN can communicate directly. The more generally preferred mode of operation for such a mobile telephone is connection to a local access point, whereby the user can contact any source available to the Internet for conversation or gaming.

In a local area network communication, the access point transmits information separately to each local wireless device. An advantage to using a point-to-point communication is that different information (e.g., customization) may be sent to each wireless device. Even if the same information is being sent to several recipients (e.g., ensuring uniformity of a game's state for all local users coordinated by a remote server), however, in a point-to-point communication with multiple recipients, the information is transmitted redundantly to each recipient. However, an access point, comprising a wireless communication module and access point server which connects to an IP network, game state information may be transmitted, daisy chain, along point-to-point communications from an access point within range of only one wireless device, thereby extending the effective communication range of the access point.

IEEE 802.11 protocols comprise negotiation-of-device or device-type negotiation using Information Elements. In a specific example, a server may send to a client a device-type inquiry, to which a device-type response is made by the client. These information elements carry only device information.

It is well known that vendor specific information can be carried in the information elements (IE's). However, information in IE's which is vendor specific cannot be used by wireless devices which are made by another vendor. In addition, information in IE's which is vendor specific cannot be used by applications available via the wireless network.

There is a need for a system which is uses information elements for additional purposes.

SUMMARY OF THE INVENTION

The present invention relates to providing new capabilities for the IEEE 802.11 beacon.

In 802.11, data frames carry information from higher layers. However, management and control frames must be provided that support data transfer. The beacon frame is a type of management frame. A wireless local network requires these management frames for stations to establish and maintain communications.

A typical beacon frame is about fifty bytes long. It contains a common frame header and cyclic redundancy checking field, including others. The beacon also contains a service set identifier (SSID). The SSID identifies a specific wireless local area network. Before associating with said network, a wireless device must have the same SSID as the access point.

In ad hoc networks, the communication is point-to-point, not through access points. Thus, one of the wireless devices must take on responsibility for sending the beacon.

It is an object of the invention to provide application protocols for local wireless networks and personal area networks that provide for connection of one wireless device to another and thereafter having the wireless devices exchange capabilities. Capabilities of the devices are those known in the art. This mode of the invention may not work if the peer wireless devices do not or cannot associate at that time. For example, a wireless device enabled for IEEE 802.11 communication can only associate to one other wireless device at a time. Under that current protocol, it is impossible to connect to another network or system to determine capabilities beyond those in the devices beacon.

The IEEE 802.11 beacon is able to transmit a 32-character network identifier. This network identifier is only intended to carry the name of the network. Actual capabilities of the network are carried in other IE's. The invention system comprises additional uses for the SSID to include reliable and secure capability encoding. The SSID in the system can be controlled by applications and transmitted with periodic broadcasting or point to point communication, so interoperable communication of application or user preferences/capabilities/membership can be transmitted and quickly determined by peers.

BRIEF DESCRIPTION OF THE DRAWINGS

There are no drawing figures.

DETAILED DESCRIPTION OF THE INVENTION

The following are specific examples of the invention system.

The IEEE 802.11 beacon SSID is adapted to serve as a capabilities encoding channel.

For example, encoded capabilities and preferences are incorporated into the SSID to determine:

Group membership: such as invited members of a conference or game playing group.
User preferences:
Device capabilities:
System location:
Game state: such as a point of play in a computer game.
Encryption and security preferences:
Application software state: such as viewing a specific file.
The following are further examples of the invention system incorporating the use of SSID transmission of information:
Encoding of information where the information is encrypted.
Encoding of information: such as where information is integrity protected (checksum, secure hash, keyed hash, digital signature).
Encoding of information as a unique hash of capabilities.
Encoding as bit string with bits indicating capabilities.
Encoding where a bit string can have different encoding semantics based on receiver context.

Encoding used by peer mobile devices to alert user of proximity to another device.

Proximity used to indicate preferences of peer device user.

Proximity used as part of a game.

Encoding is encrypted to only allow access to information by approved peers.

Encoding is used as part of process to create encryption keys for subsequent communications.

After obtaining encoded SSID, device may use central server to assist in decoding.

Central server may return additional identity or location information.

Multiple different SSIDs can be used to define a single BSS.

Multiple different SSIDs can be used to define a single iBSS.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. A system comprising:
    a plurality of wireless devices configured for wireless communication in a wireless network, wherein the wireless network is compliant with an Institute of Electrical and Electronics Engineers (IEEE) 802.11 standard,
    wherein a beacon is respectively transmittable by each of the plurality of wireless devices, wherein the beacon contains a service set identifier (SSID) that
        i) identifies the wireless network, and
        ii) is encoded to include a capability or a preference of the wireless device transmitting the beacon, and
    wherein in response to a first wireless device of the plurality of wireless devices receiving a beacon containing the service set identifier (SSID) from a second wireless device of the plurality of wireless devices, the first wireless device transmits the service set identifier (SSID) to a central server,
    wherein, responsive to receiving the service set identifier (SSID), the central server is configured to
        i) decode the service set identifier (SSID) to retrieve the capability or the preference of the second wireless device as encoded into the service set identifier (SSID), and
        ii) transmit, to the first wireless device, the capability or the preference of the second wireless device.

2. A system comprising:
    N wireless devices configured for communication in a wireless network, wherein the wireless network is compliant with an Institute of Electrical and Electronics Engineers (IEEE) 802.11 standard, wherein N is an integer greater than 1,
    wherein a first wireless device of the N wireless devices is configured to transmit a beacon, wherein the beacon includes a service set identifier (SSID) that
        i) identifies the wireless network, and
        ii) is encoded to include a capability or a preference of the first wireless device,
    wherein, in response to a second wireless device of the N wireless devices receiving the beacon containing the service set identifier (SSID) from the first wireless device, the second wireless device is configured to transmit the service set identifier (SSID) to a central server, and
    wherein, responsive to receiving the service set identifier (SSID) from the second wireless device, the central server is configured to
        i) decode the service set identifier (SSID) to retrieve the capability or the preference of the first wireless device as encoded into the service set identifier (SSID), and
        ii) transmit, to the second wireless device, the capability or the preference of the first wireless device.

3. The system of claim 2, wherein the wireless network comprises an ad-hoc network or an infrastructure network.

4. The system of claim 2, wherein the second wireless device is configured to connect to the first wireless device in accordance with the capability or the preference of the first wireless device as received from the central server.

5. The system of claim 2, wherein the first wireless device is configured to transmit the service set identifier (SSID) by:
    periodically broadcasting the service set identifier (SSID); or
    transmitting the service set identifier (SSID) in accordance with point-to-point communication.

6. The system of claim 2, wherein the capability or the reference encoded in the service set identifier (SSID) comprises one or more of membership information, user preferences, device capabilities, location information, encryption and security preferences, or a state of a software of the first wireless device.

7. The system of claim 2, wherein:
    based on the service set identifier (SSID), the second wireless device is configured to alert a user of the second wireless device of a proximity of the first wireless device to the second wireless device, wherein the capability or the preference of the first wireless device is indicated based on the proximity.

8. The system of claim 2, wherein the service set identifier (SSID) is encrypted to allow access to the wireless network by authorized ones of the N wireless devices.

9. The system of claim 2, wherein the N wireless devices generate encryption keys for communication based on the service set identifier (SSID).

10. A method comprising:
    receiving, at a first wireless device, a beacon transmitted from a second wireless device, wherein the beacon is transmitted from the second wireless device to the first wireless device through a wireless network that is compliant with an Institute of Electrical and Electronics Engineers (IEEE) 802.11 standard, and wherein the beacon is encoded to include a capability or a preference of the second wireless device;
    transmitting the service set identifier (SSID) from the first wireless device to a central server, wherein the service set identifier (SSID) is decodable by the central server to retrieve the capability or the reference of the second wireless device as encoded into the service set identifier (SSID); and
    subsequent to transmitting the service set service set identifier (SSID) from the first wireless device to a central server, receiving, at the first wireless device, the capability or the preference of the second wireless device from the central server.

11. The method of claim 10, wherein the wireless network comprises an ad-hoc network or an infrastructure network.

12. The method of claim 10, further comprising:
in accordance with the capability or the preference of the second wireless device received from the central server, connecting the first wireless device to the second wireless device.

13. The method of claim 10, wherein the beacon is transmitted from the second wireless device by being periodically broadcasted throughout the wireless network or by being periodically transmitted in accordance with point-to-point communication.

14. The method of claim 10, wherein the capability or the preference of the second wireless device comprises one or more of membership information, user preferences, device capabilities, location information, encryption and security preferences, or a state of a software of the second wireless device.

15. The method of claim 10, further comprising:
based on the service set identifier (SSID), alerting a user of the first wireless device of a proximity of the second wireless device to the first wireless device; and
indicating the capability or the reference of the second wireless device based on the proximity.

16. The method of claim 10, wherein the service set identifier (SSID) is encrypted.

17. The method of claim 10, further comprising:
based on the service set identifier (SSID), generating encryption keys for communication in the wireless network.

\* \* \* \* \*